US008494983B2

(12) United States Patent
Wang et al.

(10) Patent No.: US 8,494,983 B2
(45) Date of Patent: Jul. 23, 2013

(54) OBJECT-SENSITIVE IMAGE SEARCH

(75) Inventors: Meng Wang, Singapore (SG);
Xian-Sheng Hua, Beijing (CN); Yan Song, Anhui (CN)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 12/947,083

(22) Filed: Nov. 16, 2010

(65) Prior Publication Data
US 2012/0123976 A1 May 17, 2012

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| | | | |
|---|---|---|---|
| 7,421,455 B2 * | 9/2008 | Hua et al. ............................... | 1/1 |
| 7,587,398 B1 * | 9/2009 | Fredricksen et al. ................. | 1/1 |
| 7,707,129 B2 * | 4/2010 | Zhuang et al. .................. | 706/20 |
| 7,756,845 B2 | 7/2010 | Madani et al. | |
| 7,773,813 B2 * | 8/2010 | Hua et al. ...................... | 382/224 |
| 7,873,583 B2 * | 1/2011 | Laxman et al. ................. | 706/20 |
| 7,996,341 B1 * | 8/2011 | Kueck .............................. | 706/12 |
| 8,175,847 B2 * | 5/2012 | Zhang et al. .................. | 702/181 |
| 8,180,766 B2 * | 5/2012 | Yang et al. .................... | 707/723 |
| 8,219,511 B2 * | 7/2012 | Yang et al. ....................... | 706/45 |
| 8,224,964 B1 * | 7/2012 | Fredrickson et al. .......... | 709/227 |
| 8,239,333 B2 * | 8/2012 | Yang et al. ....................... | 706/12 |
| 8,249,366 B2 * | 8/2012 | Mei et al. ....................... | 382/224 |
| 8,275,790 B2 * | 9/2012 | Fredricksen et al. .......... | 707/782 |
| 8,346,617 B1 * | 1/2013 | Tanquary ...................... | 705/26.1 |
| 2009/0080731 A1 | 3/2009 | Krishnapuram et al. | |
| 2009/0232403 A1 | 9/2009 | Waragai et al. | |
| 2009/0290802 A1 | 11/2009 | Hua et al. | |
| 2009/0292685 A1 | 11/2009 | Liu et al. | |
| 2009/0310854 A1 | 12/2009 | Mei et al. | |

OTHER PUBLICATIONS

Chen, et al., "MILES: Multiple-Instance Learning via Embedded Instance Selection", retrieved on Aug. 27, 2010 at <<www.tele.ucl.ac.be/.../pami06_chen_MILViaEmbeddedInstanceSelection.pdf>>, IEEE Computer Society, Transactions on Pattern Analysis and Machine Intelligence, vol. 28, No. 12, Dec. 2006, pp. 1-17.
Cholleti, et al., "MI-Winnow: A New Multiple-Instance Learning Algorithm", retrieved on Aug. 27, 2010 at <<http://ieeexplore.ieee.org/stamp/stamp.jsp?tp=&arnumber=1241200>>, IEEE Computer Society, Proceedings of International Conference on Tools with Artificial Intelligence (ICTAI), 2006, pp. 1-8.

(Continued)

*Primary Examiner* — Michael B Holmes
(74) *Attorney, Agent, or Firm* — Lee & Hayes, PLLC

(57) ABSTRACT

Methods and systems for object-sensitive image searches are described herein. These methods and systems are usable for receiving a query for an image of an object and providing a ranked list of query results to the user based on a ranking of the images. The object-sensitive image searches may generate a pre-trained multi-instance learning (MIL) model trained from free training data from users sharing images at websites to identify a common pattern of the object, and/or may generate a MIL model "on the fly" trained from pseudo-positive and pseudo-negative samples of query results to identify a common pattern of the object. As such, the user is presented with query results that include images that prominently display the object near the top of the results.

20 Claims, 7 Drawing Sheets

OTHER PUBLICATIONS

Deng, et al., "Unsupervised Segmentation of Color-Texture Regions in Images and Video", retrieved on Aug. 27, 2010 at <<http://citeseerx.ist.psu.edu/viewdoc/download?doi=10.1.1.17.8667&rep=rep1&type=pdf>>, IEEE Transactions on Pattern Analysis and Machine Intelligence, vol. 23, No. 8, Aug. 2001, pp. 800-810.

Liu, et al., "Learning to video search rerank via pseudo preference feedback", retrieved on Aug. 27, 2010 at <<http://ieeexplore.ieee.org/xpl/freeabs_all.jsp?arnumber=4607430>>, IEEE International Conference on Multimedia and Expo (ICME), 2008, pp. 297-300.

Tian, et al., "Bayesian Video Search Reranking", retrieved on Aug. 27, 2010 at <<http://doi.acm.org/10.1145/1459359.1459378>>, ACM, Proceedings of Conference on MultiMedia (MM), Vancouver, Canada, Oct. 2008, pp. 131-140.

Vijayanarasimhan, et al., "Keywords to Visual Categories: Multiple-Instance Learning for Weakly Supervised Object Categorization", retrieved on Aug. 27, 2010 at <<http://userweb.cs.utexas.edu/~svnaras/papers/vijayanarasimhan_grauman_cvpr2008.pdf>>, IEEE Conference on Computer Vision and Pattern Recognition, Anchorage, Alaska, Jun. 2008, pp. 1-8.

Yan, et al., "Multimedia Search with Pseudo -Relevance Feedback", retrieved on Aug. 27, 2010 at <<http://citeseerx.ist.psu.edu/viewdoc/download?doi=10.1.1.127.7249&rep=rep1&type=pdf>>, International Conference on Image and Video Retrieval (CIVR), Urbana, Illinois, Jul. 2003, pp. 1-10.

Zhou, et al., "Locating Regions of Interest in CBIR with Multi-Instance Learning Techniques", retrieved on Aug. 27, 2010 at <<http://cs.nju.edu.cn/zhouzh/zhouzh.files/publication/ajcai05.pdf>>, Proceedings of Australian Joint Conference on Artificial Intelligence, Sydney, Australia, 2005, pp. 92-101.

Zhou, "Multi-Instance Learning: A Survey", retrieved on Aug. 27, 2010 at <<http://citeseerx.ist.psu.edu/viewdoc/download?doi=10.1.1.85.9873&rep=rep1&type=pdf>>, Department of Computer Sciences and Technology, Nanging University, Technical report, 2004, pp. 1-32.

\* cited by examiner

OBJECT-SENSITIVE IMAGE SEARCH

BACKGROUND

Text-based search engines traditionally retrieve relevant images or other elements (e.g., videos, documents, etc.) based on textual information. For example, a search engine may receive an image query "car," and subsequently search billions of documents and ultimately provide relevant images based on textual information in the documents. These traditional search engines may determine "relevance" by considering such factors as link structure, link text, anchor text, or any other suitable textual information. For example, web images may be indexed with words from image titles, surrounding texts, or the like such that search engines determine a web image's relevance based on the image's title rather than the visual content of the image itself.

While text-based search engines may work well in returning the text-based documents, text-based search engines do not take into account the visual information of images, and therefore may provide inaccurate image-based query results.

SUMMARY

This summary is provided to introduce simplified concepts for object-sensitive image searches, which are further described below in the Detailed Description. This summary is not intended to identify essential features of the claimed subject matter, nor is it intended for use in determining the scope of the claimed subject matter.

In some instances, the object-sensitive image searches described herein comprise re-ranking images based on the object information, which is obtained utilizing multi-instance learning (MIL). The technique is able to provide very high precision in returning images of objects (e.g., animals, plants, products, etc.) by prioritizing relevant query results in ranking lists for object-level queries by taking into account the visual information of search result images.

In one implementation, the object-sensitive image search techniques may be configured as an off-line system, which may utilize free public information to build a MIL model for object-sensitive re-ranking. In this implementation, a service provider's computing system (e.g., located on the "back end") may train the MIL model.

In another implementation, the techniques may be configured as an on-line system, which may utilize pseudo-positive and pseudo-negative samples in query results to build a MIL model for object-sensitive re-ranking. In this implementation, a user's computing system (e.g., located on the "front end") may train the MIL model.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes object-sensitive image searches. For instance, systems and methods are described for receiving a query for images of an object, generating query results comprising images that include the object, ranking the images, and providing a ranked list of query results to the user based on the ranking of the images. In some instances, the ranked list is based on a prominence (e.g., size, position, etc.) of the object within the images. For instance, in response to receiving a image query "car," the systems and methods may return a ranked list of images that are ordered, at least in part, on the prominence of cars in the returned images—rather than simply the most relevant images as determined via the text or metadata associated with the images. As such, those images including large or centrally positioned cars may be provided at the top of the returned ranked list in this example.

Additionally or alternatively, the object-sensitive image searches may generate a pre-trained multi-instance learning model trained to identify a common pattern of the object (e.g., the car). In other examples, the object-sensitive image searches may generate a multi-instance learning model "on the fly" trained to identify a common pattern of the object.

As discussed above, while text-based search engines may provide very high precision in returning text-based documents, text-based search engines often do not take into account the visual information of images, and therefore may provide inaccurate image-based query results. However, this disclosure describes, in detail below, an object-sensitive image search system and method that may provide accurate image results to a user submitting an image-based query.

While the techniques described in this disclosure may be described with respect to images such as still images of objects, other forms of images are contemplated. For example, the techniques described in this disclosure may be described with respect to images such as videos, animations, or the like.

Illustrative Object-Sensitive Image Search Computing Environment

Figure 1:
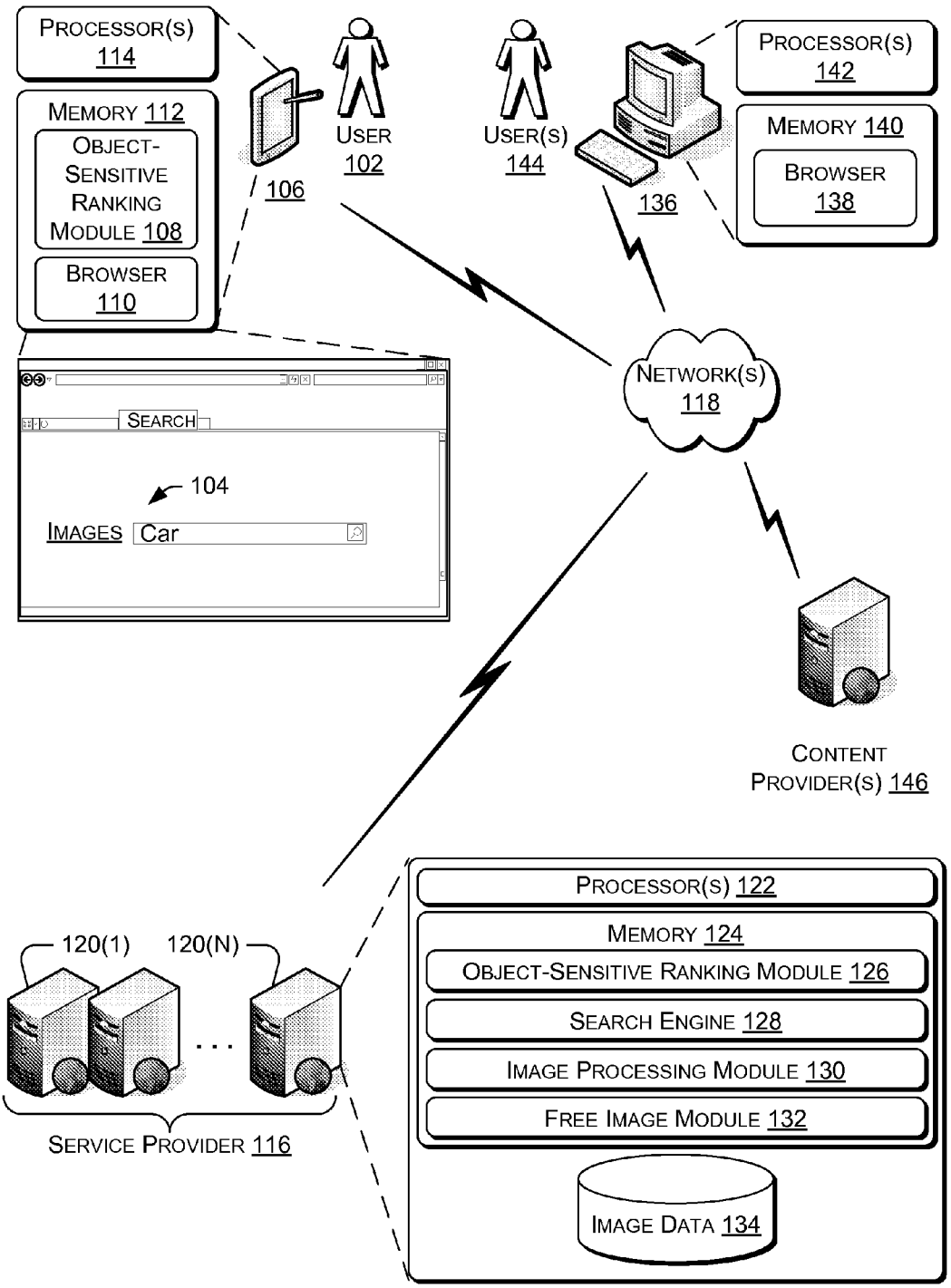
FIG. 1 represents an illustrative computing environment that may implement off-line and on-line object-sensitive image searches.

FIG. 1 represents an illustrative computing environment in which an off-line approach and/or an on-line approach of object-sensitive image searches can be implemented. By way of example only, FIG. 1 illustrates a user 102 performing a query 104 for images of an object (in this example, images of a "car") via a computing device 106. As illustrated, the computing device may include an object-sensitive ranking module 108 and a browser 110 stored in memory 112 and executable by processor(s) 114. In some instances, however, the object-sensitive ranking module 108 may additionally or alternatively reside remotely from the computing device 106, as discussed below.

Here, FIG. 1 illustrates the computing device 106 communicatively coupled with a service provider 116 via a network(s) 118. Service provider 116 may include one or more servers 120(1)-120(N), which may comprise processor(s) 122 and memory 124. FIG. 1 further illustrates the memory 124 of the one or more servers 120(1)-120(N) may include an object-sensitive ranking module 126, a search engine 128, and an image processing module 130, a free image module 132, and image data 134, which may be executable by processor 122.

Generally, when a user 102 submits a query 104 for an image of an object (e.g., "car"), the implementation illustrated in FIG. 1 may utilize, in combination or individually, the object-sensitive ranking module 126 stored in memory 124 of the one or more servers 120(1)-120(N) and/or the object-sensitive ranking module 108 stored in memory 112 of the computing device 106. Both the object-sensitive ranking module 108 and the object-sensitive ranking module 126 may be configured to provide a ranked list of query results to the user 102 based on ranked images. For example, the computing environment illustrated in FIG. 1 may utilize the object-sensitive ranking module 126 stored in memory 124 of the one or more servers 120(1)-120(N) in an off-line approach to provide a ranked list of query results to the user 102 based on ranked images. Alternatively, the computing environment illustrated in FIG. 1 may utilize the object-sensitive ranking module 108 stored in memory 112 of the computing device 106 in an on-line approach to provide a ranked list of query results to the user 102 based on ranked images.

In either instance, the module may provide a list that is ranked according to a prominence (e.g., size, position, etc.) of a searched-for object. For instance, in the example where the user 102 conducts a search for "car," the module may analyze those images returned by traditional text-based techniques to determine a prominence of the cars therein. The module may then re-rank the images according to the detected prominence, such that an image that is largely occupied by a car may be ranked relatively higher than an image that includes a less-visible car or no car at all. By doing so, the object-sensitive ranking module 108 and/or 126 provides a better search experience to the user 102 than compared with traditional text-based-only techniques.

With respect to the off-line approach, FIG. 1 illustrates the one or more servers 120(1)-120(N) of the service provider 116 communicatively coupled, via the network(s) 118, with a plurality of computing devices 136(1)-136(N). Each of the computing devices 136(1)-136(N) may comprise a browser 138 stored in memory 140 and executable by one or more processor(s) 142. Further, each of the computing devices 136(1)-136(N) may be utilized by a plurality of users 144. These users 144 may employ the computing devices 136(1)-(N) to share images at a plurality of websites, to submit a plurality of queries for images of objects, or the like.

In the off-line approach, the free image module 132 stored in memory 124 of the one or more servers 120(1)-120(N) may monitor the queries submitted by the users at one or more search engines to determine which objects users tend to search for. With this information, the service provider 116 may select one or more objects for which to train multi-instance learning (MIL) models for use by the object-sensitive ranking module 126. For instance, the service provider 116 may see that the users 144 most often search for "cars," "flowers," etc. and may correspondingly train MIL models for these respective objects.

After determining the objects for which to train MIL models, the free image module 132 may analyze images of these objects at a plurality of content provider(s) 146 (e.g., websites, etc.) to build pre-trained MIL models. For instance, the free image module 132 may analyze each photo at one or more photo sharing websites (e.g., Flickr®, etc.) that is associated (e.g., via a user-provided tag) with a particular object, such as "car." The free image module 130 may then build a MIL model for the object "car" for use by the object-sensitive ranking module 126. In this off-line implementation, each of the pre-trained MIL models may be trained to recognize a common pattern of the objects. With this information, the object-sensitive ranking module 126 may rank or re-rank search results for a subsequent query by comparing each image of the search results with the corresponding MIL model to determine whether the object is prominent or not within the image.

In contrast to the off-line approach, in the on-line approach the object sensitive ranking module 108 trains a MIL model "on the fly." For example, when a user 102 submits a query 104 (e.g., "car"), the object-sensitive ranking module 108 may train a MIL model using the query results that are returned using traditional search-engine techniques. Here, in this implementation, the MIL model may be trained to recognize a common pattern of the object of the query 104 submitted by the user 102. With this model, the object-sensitive ranking module 108 then re-ranks the images to place images that prominently display the searched-for object (e.g., "car") near the top of the search results returned to the user.

Both the object-sensitive ranking module 126 stored in memory 124 of the one or more servers 120(1)-120(N) and the object-sensitive ranking module 108 stored in memory 112 of the computing device 106 may utilize image data 134 stored in memory 124, along with MIL models, to perform object-sensitive ranking and/or re-ranking. While FIG. 1 illustrates image data 134 stored in memory 124, image data 134 may be stored on memory 112 of computing device 106. Both the object-sensitive ranking module 126 stored in memory 124 of the one or more servers 120(1)-120(N) and the object-sensitive ranking module 108 stored in memory 112 of the computing device 106 may then utilize the image data 134 and the MIL models to perform object-sensitive ranking and/or re-ranking, whether the data is stored on memory 124, memory 112, or any other suitable memory store location.

Illustrative Off-Line Object-Sensitive Image Search System

Figure 2:
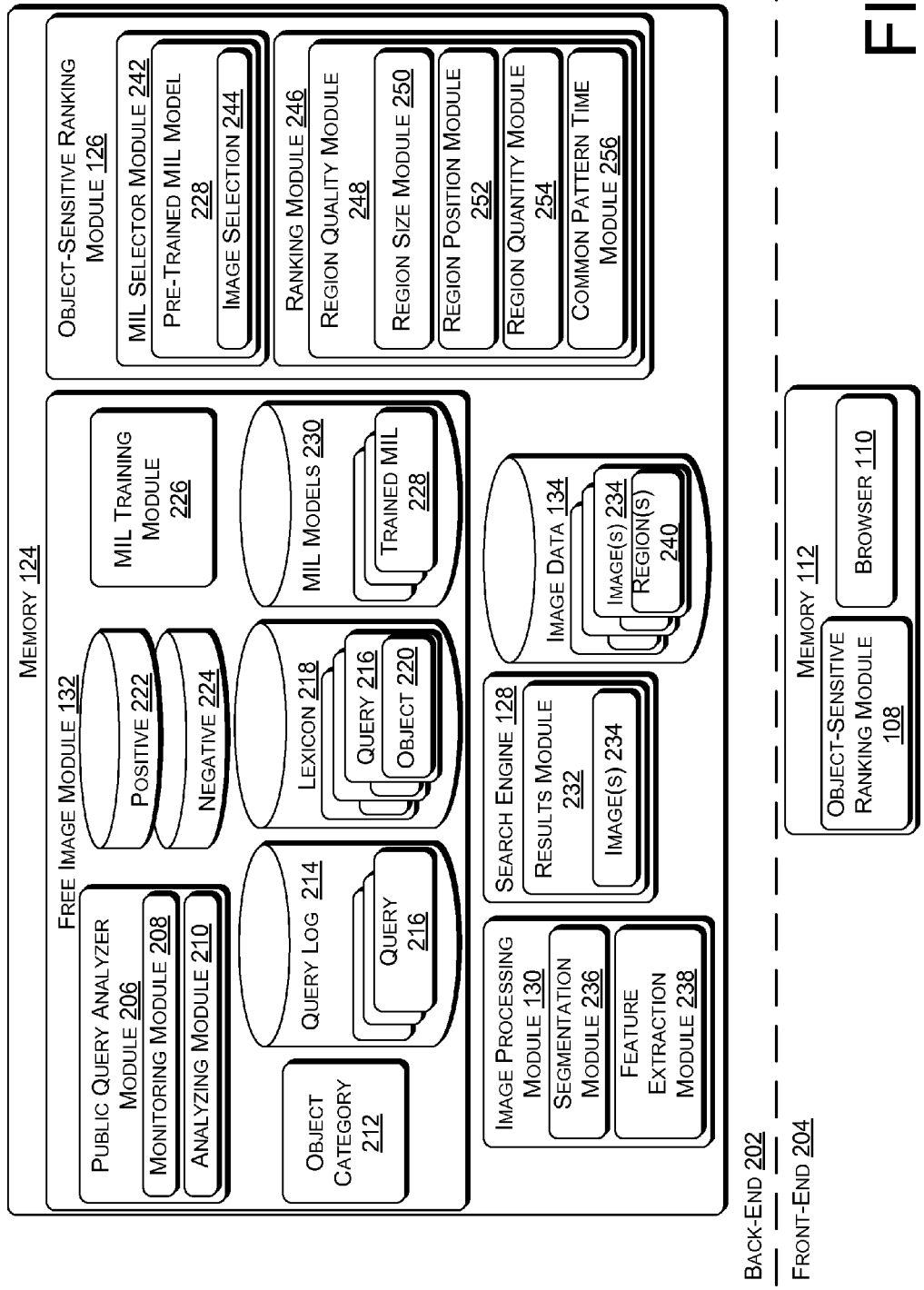
FIG. 2 is a block diagram of an example off-line approach of an object-sensitive image search system being implemented in the computing environment in FIG. 1.

FIG. 2 is a block diagram of an example off-line approach of an object-sensitive image search system being implemented in the computing environment of FIG. 1. FIG. 2 illustrates that a back-end 202 of the system may comprise the memory 124 of the one or more servers 120(1)-120(N) of the service provider 116, while a front end 204 of the system may comprise memory 112 of the client computing device 106. As discussed above, the memory 124 may include the object-sensitive ranking module 126, the search engine 128, the image processing module 130, the free image module 132, and the image data 134 for implementing, in part or in whole, object-sensitive image searches.

In this embodiment, FIG. 2 illustrates that the free image module 132 may comprise a public query analyzer module 206. The public query analyzer module 206 may further comprise a monitoring module 208 and an analyzing module 210 for monitoring and analyzing search-engine queries previously made by the users 144. Generally, the public query analyzer module 206 may utilize the monitoring module 208 to monitor the queries submitted by the users 144, and utilize the analyzing module 210 to determine which objects users 144 tend to search for. The public query analyzer module 206 may store the determined objects users 144 tend to search for in an object category 212. The object category 220 may comprise a plurality of animals, plants, and/or products as objects users 144 tend to search for.

To identify the queries that users tend to search for, the public query analyzer module 206 may consult a query log 214, which stores one or more queries 216 that the users 144 have previously conducted searches for. After analyzing the queries 216 submitted by the users, the free image module 132 may build a lexicon 218 containing each query 216 and its object 220 that belong to an object in the object category 212. That is, the lexicon 218 of object queries may comprise a plurality of objects 220 from the plurality of queries 216. For example, the plurality of objects 220 may comprise a plurality of animals, plants, and/or products that the public query analyzer module 206 may have determined users 144 tend to search for by monitoring the queries previously submitted by the plurality of users 144. With knowledge of these objects, a MIL model may then be built for each of the objects, as described below.

To build a MIL model for each identified object 220 in the lexicon 218, both positive training data 222 and negative training data 224 may then be gathered from one or more of the content providers 146 of FIG. 1. In one example, the public query analyzer module 206 may analyze each photo at one or more photo-sharing websites (e.g., Flickr®, etc.) that is associated (e.g., via a user-provided tag) with a particular object, such as "car." For example, the public query analyzer module 206 may label images as positive instances if users 144 have tagged the image with the object "car," otherwise the images are label as negative instances. A MIL training module 226 may then train a pre-trained MIL model 228 to identify a common pattern of each object 220. More specifically, the MIL training module 226 may train the pre-trained MIL models 228 utilizing both the positive training data 222 and negative training data 224 gathered for each object 220 in the lexicon 218. Each of the pre-trained MIL models 228 may be stored in a set of MIL models 230 for use in providing a ranked list of query results to a user 102.

FIG. 2 further illustrates the off-line object-sensitive image search system includes the search engine 128 of FIG. 1. The off-line object-sensitive image search system illustrated here in FIG. 2 may receive a query 104 from browser 110 via the search engine 128. Search engine 128 may include results module 232, which may provide image(s) 234 associated with the query results. The image processing module 130 of FIG. 1 may include a segmentation module 236 and a feature extraction module 238 for processing the image(s) 234 provided by the search engine 128. For example, the image processing module 130 may be configured to segment each of the images 234 into region(s) 240 and extract features from the region(s) 240. The regions 240 and features may be used by a pre-trained MIL model 228 to select images 234 from the query results comprising a common pattern of an object 220 in a region 240.

FIG. 2 illustrates the object-sensitive ranking module 126, illustrated in FIG. 1, may comprise a MIL selector module 238 configured to select a pre-trained MIL model 228 from the set of MIL models 230 for a query 104 that matches an object 220 in the received query. For instance, in response to receiving a query for "car," the MIL selector module 238 may select a MIL model associated with the object "car." Here, FIG. 2 illustrates the pre-trained MIL model 228 may be configured for image selection 244, which, as discussed above, may be for selecting an image 234 from the query results comprising the common pattern of the object 220 in the regions 240. FIG. 2 further illustrates the object-sensitive ranking module 126 may also comprise a ranking module 242, which may comprise a region quality module 248. The region quality module 248 may further comprise a region size module 250, a region position module 252, a region quantity module 254, and a common pattern time module 256. Generally, the region quality module 248 may provide for ranking image(s) 234 selected by the pre-trained MIL model 228 based on a quality of each of the region(s) 240 comprising the common pattern of the object 220. For example, the region quality module 248 may utilize the region size module 250, the region position module 252, the region quantity module 254, and/or the common pattern time module 256 to determine individually or in any combination a region size, a region position, a region quantity, and/or an amount of time a common pattern is in a region, respectively. The ranking module 242 may then provide a ranked or a re-ranked list of the query results based on the ranked images to a computing device 106 via a browser 110 for viewing by a user 102. For instance, the ranking module 242 may re-order a set of image results to place images that are largely occupied by a "car" higher up on the list than those images that have small cars or cars that are not near the center of the image.

Illustrative Off-Line Object-Sensitive Image Search Process

The processes, described herein, are illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations in the processes are aligned with possible devices/actors that may perform these operations. However, the illustrated arrangement is only illustrative and other device/actor arrangements may be used to implement to processes. This applies to each process described herein.

Figure 3:
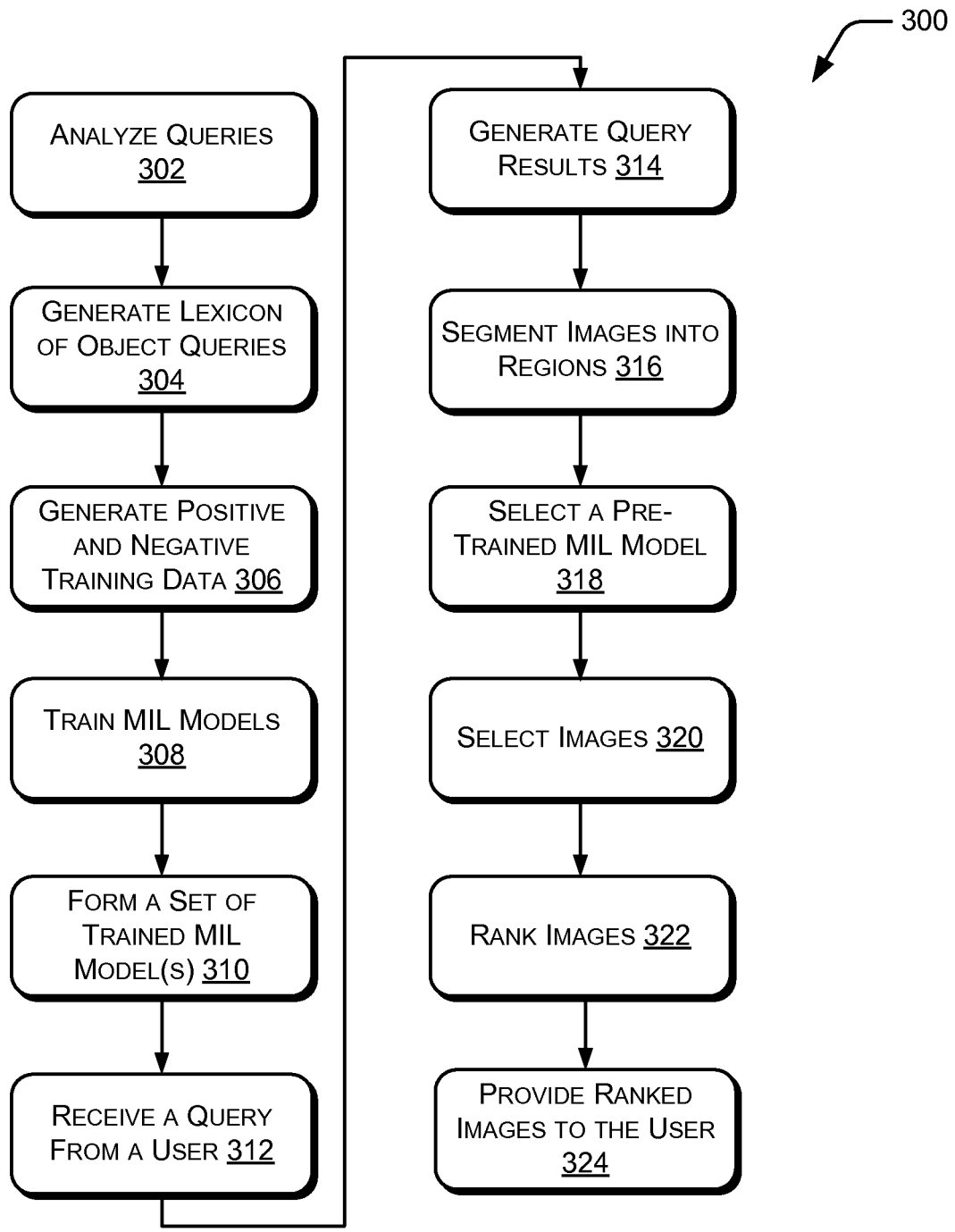
FIG. 3 is a flowchart illustrating details of a process of an off-line approach of an object-sensitive image search implementation utilizing the example off-line object-sensitive image search system of FIG. 2.

FIG. 3 is a flowchart illustrating details of a process of an off-line approach of an object-sensitive image search implementation utilizing the example off-line object-sensitive image search system of FIG. 2.

In this particular implementation, the process 300 may include block 302, which may represent analyzing a plurality of queries from a query log, such as the query log 214. For example, the public query analyzer module 206 may monitor the queries submitted by the users 144 at one or more search engines to determine which objects users tend to search for. With this information, the public query analyzer module 206 may select one or more objects for which to train MIL models for use by the object-sensitive ranking module 126. The process 300 may further include block 304, which represents generating a lexicon of object queries. As discussed above, the lexicon 218 of FIG. 2 may be generated from the query log 214. Here, the free image module 132 may generate the lexicon 218 containing each query 216 and its object 220 that belong to an object in the object category 212 that the public query analyzer module 206 may have determined users 144 tend to search for.

The process 300 may also include block 306, which represents generating positive training data 222 and negative training data 224. Here, the public query analyzer module 206 may analyze photos at one or more photo sharing websites that are associated with the objects users tend to search for. The public query analyzer module 206 may label images as positive instances if users 144 have tagged the image with the object, otherwise the images are label as negative instances. For instance, the module 206 may identify those photos that have been tagged with "car" for use as positive training data 222, as well as those photos that have not been tagged with "car" for use as negative training data 224.

At block 308, the MIL training module 226 may train MIL models to identify a common pattern of each object 220. For example, block 308 may represent the MIL training module 226 training MIL models to identify a common pattern of each object 220 utilizing both the positive training data 222 and negative training data 224 of FIG. 2. For instance, the MIL training module 226 may train a model for the object "car." Block 310, meanwhile, may represent the MIL training module 226 of FIG. 2 forming a set of pre-trained MIL models 230 comprising trained MIL models 228.

The process 300 may also include block 312, which may represent the search engine 128 receiving a query 104 from a user 102, such as the query "car" or another query that includes the object "car." Block 312 may be followed by block 314, which may represent the search engine 128 generating query results, which may comprise image(s) 234 in instances where the user 102 is conducting an image-based search. Next, at block 316 the image processing module 130 may segment each of the returned images 234 into region(s) 240 and may extract features from these region(s) 240. Block 316 may be followed by block 318, which may represent an object-sensitive ranking module 126 selecting a pre-trained MIL model 228. Here, the object-sensitive ranking module may comprise a MIL selector module 238 configured to select a pre-trained MIL model 228 from the set of MIL models 230 for a query 104 that matches an object 220 in the received query. For instance, the module may select a MIL model that has been trained for the object "car" in response to receiving the query "car" or a query that includes the term "car."

The process 300 may also include block 320, which may represent running the selected pre-trained MIL model 228 against the images 234 from the query results to identify those image(s) 234 that include a common pattern of an object 220 in one or more regions 240. For example, block 320 may represent comparing the extracted features from the region(s) 240 to the common pattern of the object 220 to identify image(s) 234 from the query results that include the common pattern of the object 220. The process 300 may then include block 322, which may represent ranking image(s) 234 of the query results 402. For example, block 322 may represent the ranking module 242 ranking the images 234 that are determined to include the common pattern of the object 220 with reference to the pre-trained MIL model 228. Here, the ranking module 242 may rank the selected images 234 based on a quality (e.g., a region size, a region position, a region quantity, and/or an amount of time a common pattern is in a region) of each of the regions 240 comprising the common pattern of the object 220. Finally, the process 300 may include block 324, which may represent providing ranked images to a user (e.g., user 102). For example, block 324 may represent providing the ranked list of the query results to the user based on the ranking of the selected image(s) 234.

Figure 4:
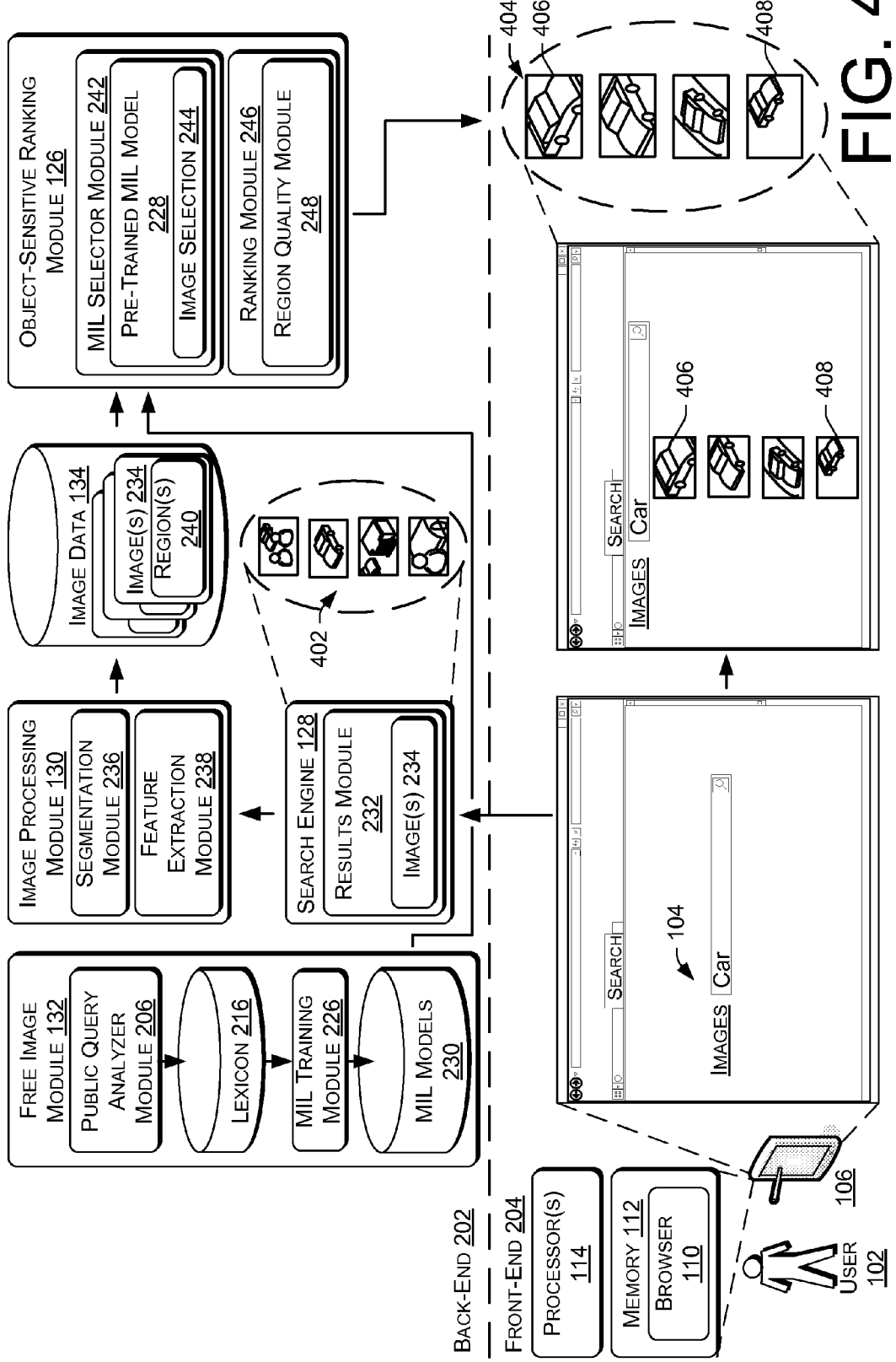
FIG. 4 represents, in more detail, the off-line approach of the object-sensitive image search computing environment of FIG. 1.

FIG. 4 represents, in more detail, the off-line approach of the object-sensitive image search computing environment of FIG. 1. Generally, FIG. 4 may illustrate the off-line approach of the object-sensitive image search providing a ranked list of query results to a user based on the ranking of the images. Here, FIG. 4 may illustrate a user 102 initiating a query 104 for an image of a "car" via the browser 110 of device 106. Next, FIG. 4 illustrates the device 106 passing the query 104 from the front-end 204 over to the search engine 128 on the back-end 202. The search engine 128 may then generate query results 402 comprising image(s) 234 via the results module 232. The results module 232 may utilize traditional techniques to generate the query results, such as performing text matching between the received query and metadata associated with the searched images (e.g., tags, etc.).

Subsequent to the results module generating query results 402 comprising image(s) 234, the image processing module 130 may then receive the search result image(s) 234 for processing. For example, the image processing module 130 may segment each of the image(s) 234 into region(s) 240 using the segmentation module 234. Here, the segmentation module 234 may use a JSEG image segmentation algorithm, as proposed in *Unsupervised Segmentation of Color-Texture Regions in Images and Video*, published August 2001, by Yining Deng, incorporated herein by reference, to segment each of the image(s) 234 into one or more region(s) 240. While FIG. 4 may illustrate the segmentation module 234 using a JSEG image segmentation algorithm, any other suitable image algorithm may be used to segment each of the image(s) 234 into region(s) 240.

The image processing module 130 may also use the feature extraction module to extract features from each segmented region(s) 240. FIG. 4 illustrates the image processing module 130 may provide the image(s) 234 and respective region(s) 240 as image data 134 for use by the object-sensitive ranking module 126. Further, FIG. 4 illustrates the object-sensitive ranking module 126 may comprise the MIL selector module 238, which may select pre-trained MIL models 238 from the set of MIL models 230.

FIG. 4 illustrates the set of MIL models 230 may have been generated by the free image module 132. Here, the free image module 132 is illustrated as gathering training data from image-sharing websites. Specifically, the free image module 132 is illustrated in FIG. 4 as being communicatively coupled with the network(s) 118 and monitoring users 144 performing image sharing acts (e.g., sharing images at websites, submitting queries for images of objects, or the like). FIG. 4 illustrates that the free image module 132 may comprise the public query analyzer module 206, the object query lexicon 218, the MIL training module 226, and the set of trained MIL models 230.

Generally, the free image module 132 may be for generating MIL models using free training data from monitoring users sharing images at websites. Further, the MIL models are generally for identifying objects in images and handles the problems in which the labels are not available for each individual instance but only for bags of instances. For example, multi-instance learning involves labeling a bag as positive if it contains a positive instance, and labeling a bag as negative if all the instances in it are negative. Therefore MIL may be suitable for identifying objects in images, since generally information regarding whether images contain a specific object or not is available. More specifically, when applying MIL algorithms in image classification, each image may be a bag and the regions may be instances. In addition, MIL algorithms not only are able to classify bags but also identify positive instances. This means that, given a specific object such as "car" and several positive and negative training images (i.e., if an image contains the object, it is positive; otherwise it is negative), MIL algorithms may be able to judge whether a new image contains the object and identify which region contains the object. Here, in this implementation of the off-line approach of the object-sensitive image search, the free image module 132 may analyze public queries using the public query analyzer module 206 and generate a lexicon 218 of this data for use by the MIL training module 226. The MIL training module 226 may then train the MIL models 230 for web images using the lexicon 218 of free training data from monitoring users sharing images at websites.

Turning back to object-sensitive ranking module 126 of FIG. 4, the ranking module 242 may rank images selected by the trained MIL models 230. For example, the ranking module 242 may rank the region(s) 240 based on a quality of each of the region(s) 240. Specifically, the region quality module 248 may determine individually or in any combination a region size, a region position, a region quantity, and/or an amount of time a common pattern is in a region, as qualities of the region(s) 240. The ranking module 242 may then generate a ranked list 404 of the query results image(s) 142 and provide the ranked list of query results to the user 102. Here, FIG. 4 illustrates the ranked list 404 may be provided to the browser 110 of computing device 106 for viewing by the user 102. FIG. 4 illustrates the ranked list 404, provided by the off-line approach of the object-sensitive search, may comprise the largest, most clear image as a highest-ranking image 406 (i.e., a first image) and a smaller image 408 as a lower-ranking image (i.e., a last image in the example set). While FIG. 4 illustrates the ranked list 404 comprising four images, the ranked list 404 may comprise any other number of one or more images.

Illustrative On-Line Object-Sensitive Image Search System

Figure 5:
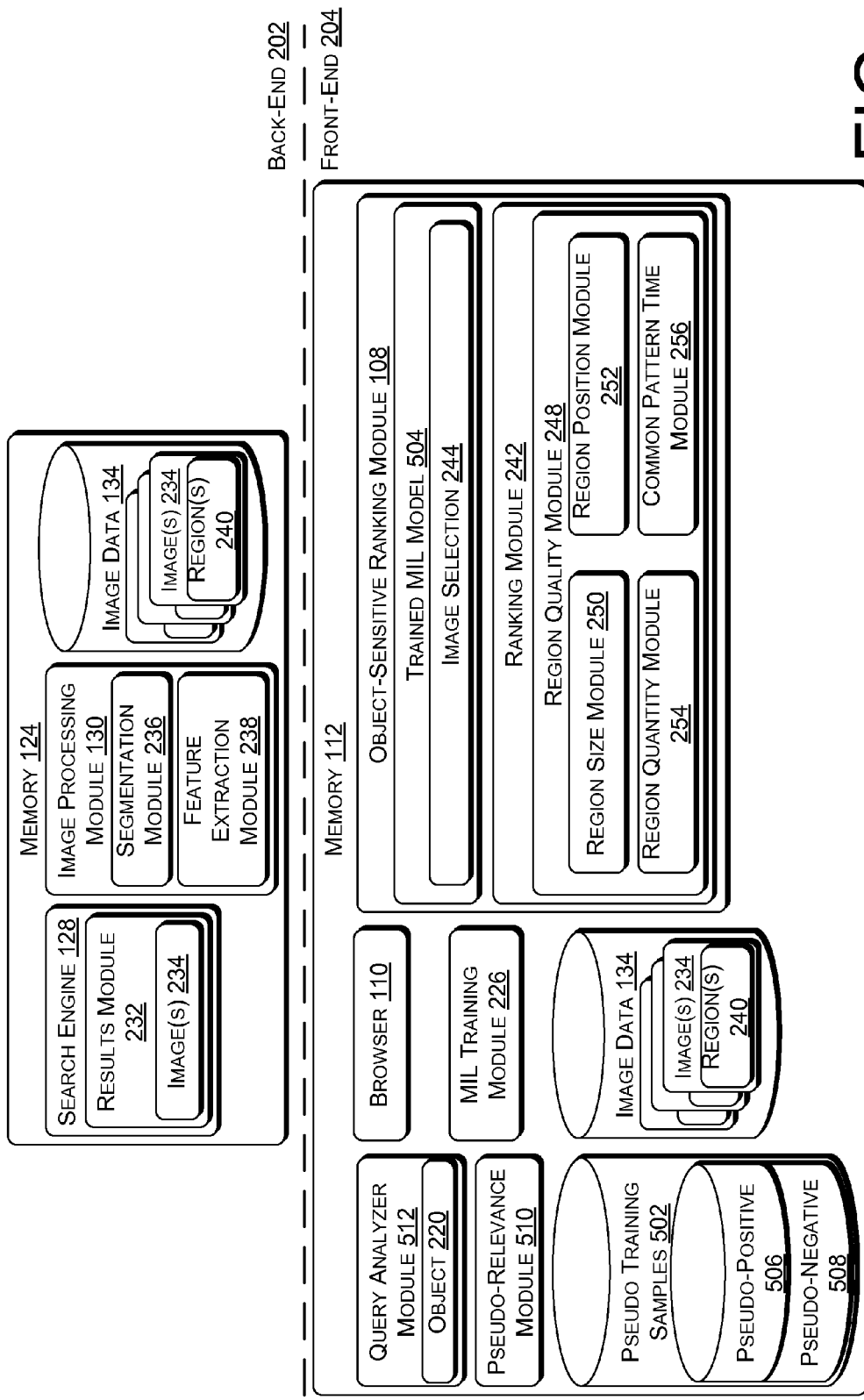
FIG. 5 is a block diagram of an example on-line approach of an object-sensitive image search system being implemented in the computing environment in FIG. 1.

FIG. 5 is a block diagram of an example on-line approach to an object-sensitive image search system being implemented in the computing environment in FIG. 1. Here, in this implementation, memory 112 of computing device 106 may comprise an object-sensitive ranking module 108, which may comprise similar modules as the object-sensitive ranking module 126 of the off-line object-sensitive image search system described in FIG. 2. For example, the object-sensitive ranking module 108 may comprise the ranking module 242. Further, and as discussed above, the ranking module 242 may comprise the region quality module 248, which may comprise the region size module 250, the region position module 252, the region quantity module 254, and/or the common pattern time module 256. The MIL training module 226 and the browser 110 may also be stored in memory 112 of the on-line object-sensitive search system of FIG. 5.

Here, in this implementation, the MIL training module 226 may utilize pseudo training samples 502 stored in memory 112 of computing device 106 to train a MIL model 504. FIG. 5 illustrates the pseudo training samples 502 may comprise pseudo-positive samples 506 and pseudo-negative samples 508. While FIG. 5 illustrates the memory 112 of computing device 106 comprising pseudo training samples 502, pseudo training samples 502 may be stored in any suitable memory location, in whole or in part. For example, a portion of the pseudo training samples 502 may be stored in memory 112, while another portion may be stored in memory 124. Further, pseudo training samples 502 may be entirely stored in memory 124, or alternatively, entirely in memory 112.

FIG. 5 further illustrates that the memory 112 may include a pseudo-relevance module 510, which may select the pseudo training samples 502. Here, the pseudo-relevance module 510 may utilize a re-ranking algorithm to select pseudo-positive samples 506 and pseudo-negative samples 508 from query results 402 generated by the results module 232 of search engine 128. For example, the pseudo-relevance module 510 may utilize pseudo-relevance feedback (PRF) as described, by Rong Yan, Alexander Hauptmann and Rong Jin, in *Multimedia Search with Pseudo-Relevance Feedback*, published Jul. 24-25, 2003 and incorporated herein by reference, to select pseudo-positive samples 506 and pseudo-negative samples 508. While the pseudo-relevance module 510 may utilize PRF as described in *Multimedia Search with Pseudo-Relevance Feedback*, any other relevance feedback, suitable for selecting positive and negative samples from query results 402, may be utilized by the pseudo-relevance module 510. FIG. 5 further illustrates memory 124 may also comprise a query analyzer module 512 configured to determine the object 220 of a query submitted by user 102.

Similarly, and as discussed above, in the on-line object-sensitive search system of FIG. 5, the memory 124 may comprise the image processing module 130. The image processing module 130 may include the segmentation module 234 and the feature extraction module 236 for processing the image(s) 234 generated by the search engine 128. For example, the image processing module 130 may be configured to segment each of the images 234 into region(s) 240 and extract features from the region(s) 240. Further, the segmented image(s) 234 and region(s) 240 may be stored as image data 134 in memory 124. Here, in this implementation, the region(s) 240 and features may be used by a trained MIL model 504 to select image(s) 234 from the query results comprising a common pattern of an object 220 in the region(s) 240.

FIG. 5 illustrates the memory 112 may also comprise image data 134. The image data 134 may be provided by the one or more sever(s) 120(1)-120(N) to computing device 106 to identify, with use of the trained MIL model 504, image(s) 234 from the query results comprising a common pattern of the object 220. While FIG. 5 illustrates the memory 124 storing the image processing module 130, in other instances the memory 112 may store this module 130. For example, the search engine 128 of the one or more sever(s) 120(1)-120(N) may process a user's (e.g., user 102) query (e.g., query 104) and provide the query results to an image processing module 130 located in memory 112 of the computing device 106.

Illustrative On-Line Object-Sensitive Image Search Process

Figure 6:
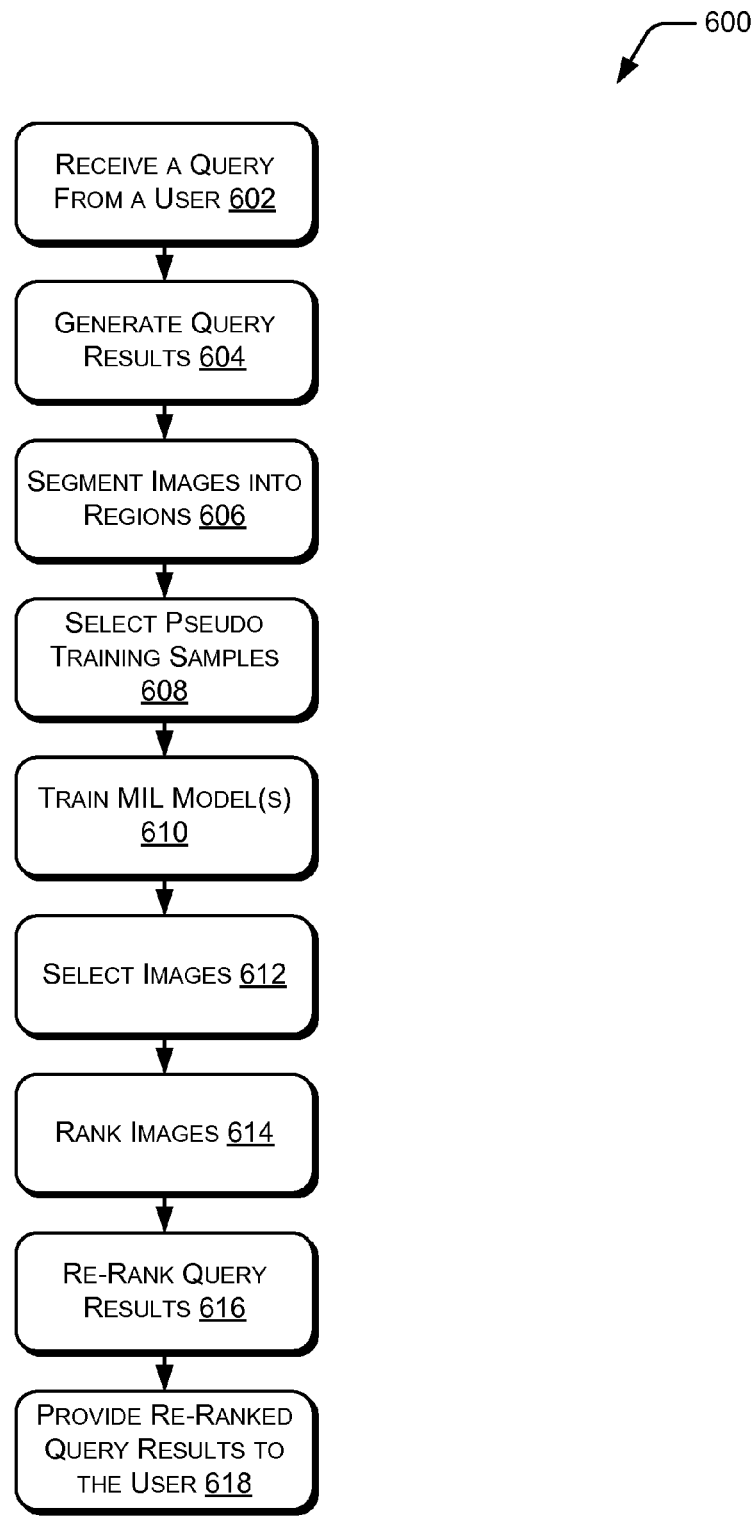
FIG. 6 is a flowchart illustrating details of a process of an on-line approach of an object-sensitive image search implementation utilizing the example on-line object-sensitive image search system of FIG. 5.

FIG. 6 is a flowchart illustrating details of a process of an on-line approach of an object-sensitive image search implementation utilizing the example on-line object-sensitive image search system of FIG. 5. In this particular implementation, the process 600 may include block 602, which may represent the search engine 128 receiving a query 106 for an image of an object 220 from a user 102. FIG. 6 illustrates block 602 may be followed by block 604, which may represent the search engine 128 results module 232 generating query results which may comprise image(s) 234 of the object based on the query 106. For instance, the results module 232 may utilize traditional text-matching techniques to produce preliminary query results, as discussed above.

The process 600 may also include block 606, which may represent the image processing module 130 segmenting each of the image(s) 234 into region(s) 240 and extracting features from the region(s) 240. The process 600 may continue with block 608, which may represent the pseudo-relevance module 510 selecting pseudo training samples 502. Here, the pseudo training samples 502 may be selected from the query results 402 generated by the results module 232 of the search engine 128. Further, the pseudo-relevance module 510 may select pseudo-positive samples 506 and pseudo-negative samples 508 from the query results 402 generated by the results module 232.

The process 600 may further include block 610, which represents the MIL training module 226 training a MIL model 504 to identify a common pattern of the object 220. For example, block 610 may represent the MIL training module 226 training the MIL model 504 "on the fly" to identify a common pattern of the object 220 utilizing both the pseudo-positive training samples 506 and pseudo-negative training samples 508 of FIG. 5. While FIG. 5 illustrates the memory 112 comprising the MIL training module 226, in other instances the memory 124 may comprise the MIL training module 226. For example, the MIL training module 226 may train the MIL model 504 on the back-end 202 and subsequently hand the trained MIL model 504 to the object-sensitive ranking module 108 on the front-end 204. Further, the MIL training module 226 may also store the "on the fly" trained MIL model 504 in memory for later use. For example, the MIL training module 226 may store the trained MIL model 504 in a set of MIL models in memory for later use by the object-sensitive ranking module 108. For example, a MIL selector module (e.g., MIL selector module 238) may be included in memory 112 and may be configured to select a trained MIL model 504 from a set of MIL models for a query 104 that matches an object 220 of a user's 102 query 104.

The block 610 may be followed by block 612, which may represent selecting images 234 from the query results comprising a common pattern of the object 220 in the region 240 with use of the trained MIL model 504. The process 600 may include block 614, which may represent ranking images 234 of the query results 402. For example, block 614 may represent the ranking module 242 ranking the images 234 identified with use of the trained MIL model 504. Here, as discussed above, the ranking module 242 may rank the selected images 234 based on a quality (e.g., a region size, a region position, a region quantity, and/or an amount of time a common pattern is in a region) of each of the regions 240 comprising the common pattern of the object 220. For example, in one implementation, the ranking module 242 may rank all the images 234 from a largest calculated region size comprising the common pattern as a highest-ranking image, to a smallest calculated region size comprising the common pattern as the lowest-ranking image. Block 614 may be followed by block 616, which may represent re-ranking the query results based on the ranking of the selected images performed at block 614. Process 600 may be completed at block 618, which may represent providing the re-ranked query results to the user.

Figure 7:
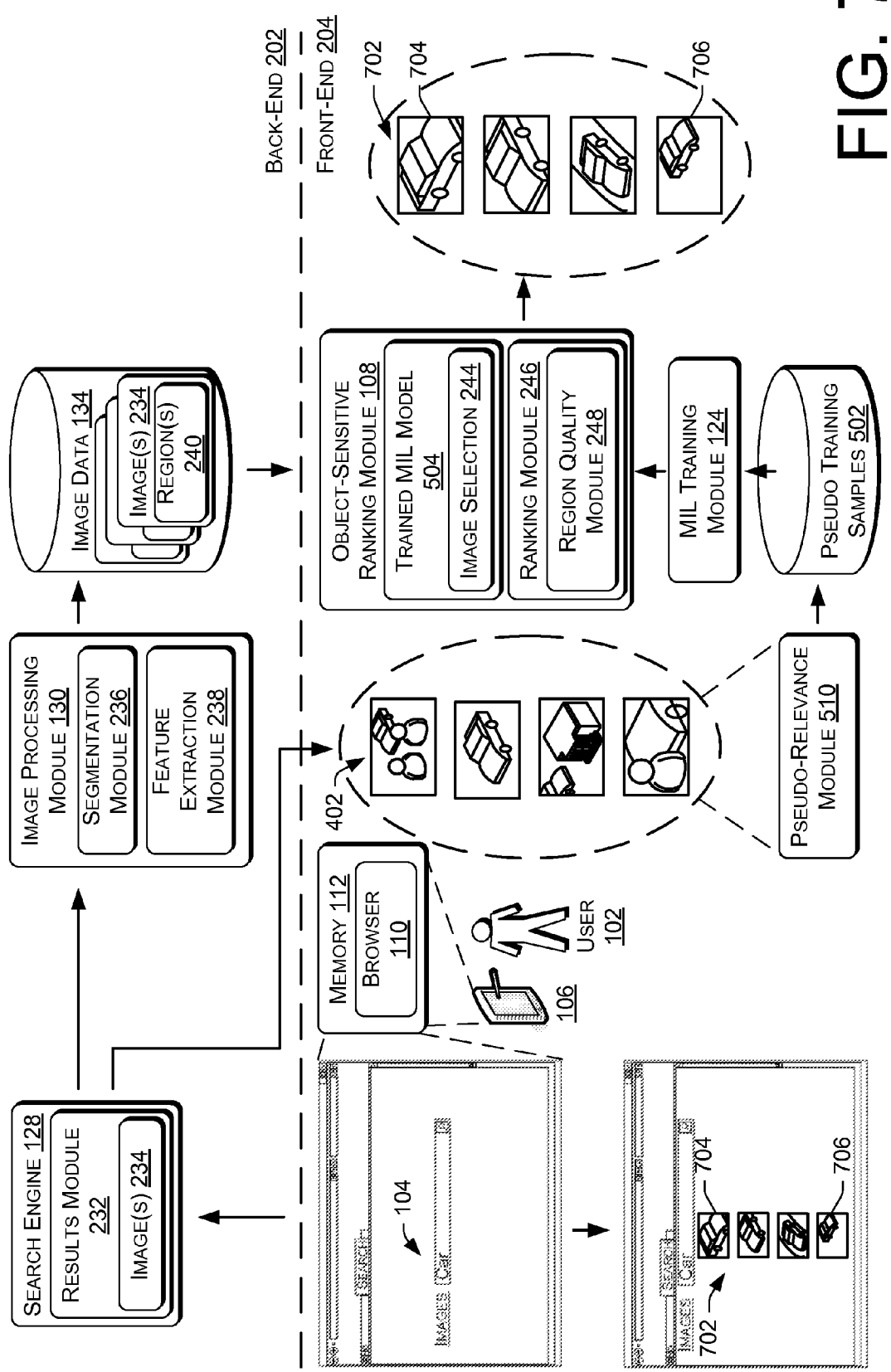
FIG. 7 represents, in more detail, the on-line approach of the object-sensitive image search computing environment of FIG. 1.

FIG. 7 represents, in more detail, the on-line approach of the object-sensitive image search computing environment of FIG. 1. Generally, FIG. 7 may illustrate the on-line approach of the object-sensitive image search providing a re-ranked list of query results to a user based on the ranking of query images. Here, FIG. 7 may illustrate a user 102 initiating a query 104 for an image of a "car" on the browser 110 of device 106. Next, FIG. 7 illustrates the device 106 passing the query 104 from the front-end 204 over to the search engine 128 on the back-end 202. The search engine 128, on the back-end 202, may then generate query results 402 comprising image(s) 234 via the results module 232. Subsequent to the results module 232 generating query results 402 comprising image(s) 234, the image processing module 130 may then receive the query results 402 image(s) 234 for processing. For example, the image processing module 130 may segment each of the image(s) 234 into region(s) 240 using the segmentation module 234. Similarly, as discussed above, the segmentation module 234 may use the JSEG image segmentation algorithm to segment each of the image(s) 234 into region(s) 240. Again, while FIG. 7 may illustrate the segmentation module 234 using a JSEG image segmentation algorithm, any other suitable image algorithm may be used to segment each of the images into regions. The image processing module 130 may also use the feature extraction module to extract features from each segmented region(s) 240.

FIG. 7 illustrates the image processing module 130 may provide the image(s) 234 and respective region(s) 240 as image data 134 for use by the object-sensitive ranking module 108 on the front-end 204. While FIG. 7 illustrates the image processing module 130 processing and storing the image data 134 on the back-end 202, the image processing module 130 may alternatively be located on the front-end 204. For example, the image processing module 130 may be stored in memory 112, where the image processing module 130 may then process and store the image data 134.

Here, in this implementation of the on-line approach of the object-sensitive image search, the pseudo-relevance module 510 may select pseudo-positive samples 506 and pseudo-negative samples 508 as pseudo training samples 502 from the query results 402 generated by the results module 232. The MIL training module 226 may then train a MIL model 504 to identify a common pattern of the object 220 in the region(s) 240 of the image(s) 234. Further, the trained MIL model 504 may be configured for image selection 228, in which the trained MIL model 504 may select, from the query results 402, images comprising the common pattern of the object 220 in the region(s) 240. The ranking module 242 comprising the region quality module 248 may then rank the image(s) 234 based on a quality of each of the region(s) 240. Specifically, the region quality module 248 may determine individually or in any combination a region size, a region position, a region quantity, and/or an amount of time a common pattern is in a region, as qualities of the region(s) 240. The ranking module 242 may then generate a ranked list of the query results image(s) 142. The object-sensitive ranking module 108 may then re-rank the query results 402 based on the ranking of the selected images.

Here, FIG. 7 illustrates the re-ranked list 702 may be provided to the browser 110 of computing device 106 for viewing by the user 102. FIG. 7 illustrates the re-ranked list 702, provided by the on-line approach of the object-sensitive search, may comprise the largest, most clear image as a highest-ranking image 704 (i.e., a first image) and a smaller image 706 as a lower-ranking image (i.e., a last image in the example set). While FIG. 4 illustrates the ranked list 404 comprising four images, the ranked list 404 may comprise any other number of images.

Conclusion

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:
1. A computer-implemented method performed at least in part by one or more processors executing computer-executable instructions that are stored in memory, the computer-implemented method comprising:
   determining an object associated with a previously submitted query;
   gathering positive training data and negative training data for the object;
   training a multi-instance learning (MIL) model associated with the object to identify a common pattern of the object using the positive training data and the negative training data;

receiving, from a user device and after the training of the MIL model, a query that is associated with the object;

generating query results comprising images associated with the object based at least in part on the receiving of the query;

segmenting the images into regions and extracting features from the regions;

comparing the extracted features from the regions to the common pattern of the object from the MIL model to identify images from the query results that include the common pattern of the object;

ranking the images that include the common pattern of the object based at least in part on a quality of each of the regions comprising the common pattern of the object; and providing the query results comprising the images to the user device based at least in part on the ranking of the images.

2. The computer-implemented method of claim 1, wherein the quality comprises a calculated size of a region comprising the common pattern.

3. The computer-implemented method of claim 2, wherein the quality further comprises a calculated position of a region comprising the common pattern.

4. The computer-implemented method of claim 2, wherein the quality further comprises a calculated quantity of regions comprising the common pattern, or a calculated time a common pattern is present in a region.

5. The computer-implemented method of claim 2, wherein the ranking comprises ranking an image from the query results having a largest calculated region that comprises the common pattern as a highest-ranking image of the query results.

6. The computer-implemented method of claim 1, further comprising building a lexicon of objects for which to build respective MIL models, each of the objects in the lexicon being associated with the previously submitted query.

7. The computer-implemented method of claim 6, wherein the plurality of objects comprise a plurality of animals, plants, and products.

8. The computer-implemented method of claim 1, wherein the gathering of positive training data and negative training data for the object comprises analyzing photos associated with the object at one or more photo-sharing websites.

9. One or more computer-readable memories, storing computer executable instructions that, when executed, cause one or more processors to perform acts comprising:

receiving, from a user device, an image-based query specifying an object;

generating query results comprising images that are associated with the object, the generating based at least in part on receiving of the query;

segmenting each of the images into regions;

selecting, as training data, a plurality of pseudo-positive and pseudo-negative samples from the query results; and training, with use of the training data, a multi-instance learning (MIL) model to identify a common pattern of the object in the regions of the images for providing a re-ranked list of the query results to the user device.

10. The one or more computer-readable memories of claim 9, further comprising:

selecting, from the query results, images comprising the common pattern of the object in the regions;

ranking each of the selected images based at least in part on a quality of each of the regions comprising the common pattern of the object; and re-ranking the query results based at least in part on the ranking of the selected images;

providing the re-ranked query results to the user device.

11. The one or more computer-readable memories of claim 10, wherein the quality comprises a calculated size of a region containing the common pattern, a calculated position of a region containing the common pattern, a calculated quantity of regions comprising the common pattern, or a calculated time a common pattern is present in a region.

12. The one or more computer-readable memories of claim 11, wherein the ranking comprises ranking an image from the query results having a largest calculated region that comprises the common pattern as a highest-ranking image of the query results.

13. A computing system comprising:

one or more processors;

one or more memories storing computer executable instructions that, when executed, cause the one or more processors to perform acts comprising:

receiving, from a user device, an image-based query specifying an object;

generating query results comprising images that are associated with the object based at least in part on the receiving of the query;

segmenting each of the images into regions;

selecting, from the query results, images comprising a common pattern of the object in the regions;

ranking each of the selected images based at least in part on a quality of each of the regions containing the common pattern of the object; and providing a ranked list of the query results to the user device based at least in part on the ranking of the selected images.

14. The computing system of claim 13, further comprising training a multi-instance learning (MIL) model to identify the common pattern of the object in the regions of the images.

15. The computing system of claim 14, wherein the object comprises an animal, a plant, or a product.

16. The computing system of claim 14, wherein the MIL model is trained prior to the receiving of the query from the user device.

17. The computing system of claim 16, wherein the MIL model is trained with use of positive training data and negative training data generated from analyzing images at one or more photo sharing websites.

18. The computing system of claim 17, wherein the positive training data and the negative training data are generated for each object in a lexicon of object queries.

19. The computing system of claim 14, wherein the MIL model is trained after and at least partly in response to the receiving of the query from the user device.

20. The computing system of claim 19, wherein the MIL model is trained with use of a plurality of pseudo-positive and pseudo-negative samples from the query results.

* * * * *